(12) United States Patent
Mitsuyasu et al.

(10) Patent No.: US 9,646,724 B2
(45) Date of Patent: May 9, 2017

(54) FUEL ASSEMBLY

(71) Applicant: Hitachi, Ltd., Chiyoda-ku, Tokyo (JP)

(72) Inventors: Takeshi Mitsuyasu, Tokyo (JP); Motoo Aoyama, Tokyo (JP); Takuji Nagayoshi, Tokyo (JP); Kenichi Katono, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 717 days.

(21) Appl. No.: 14/132,358

(22) Filed: Dec. 18, 2013

(65) Prior Publication Data

US 2014/0185735 A1  Jul. 3, 2014

(30) Foreign Application Priority Data

Dec. 27, 2012 (JP) ................................. 2012-285092

(51) Int. Cl.

| G21C 3/356 | (2006.01) |
|---|---|
| G21C 3/32 | (2006.01) |
| G21C 3/322 | (2006.01) |
| G21C 3/04 | (2006.01) |
| G21C 3/344 | (2006.01) |
| G21C 3/326 | (2006.01) |

(52) U.S. Cl.
CPC ................ *G21C 3/32* (2013.01); *G21C 3/04* (2013.01); *G21C 3/322* (2013.01); *G21C 3/344* (2013.01); *G21C 3/356* (2013.01); *G21C 2003/3265* (2013.01); *Y02E 30/38* (2013.01)

(58) Field of Classification Search
USPC .................................................. 376/439, 462
See application file for complete search history.

(56) References Cited

U.S. PATENT DOCUMENTS 4,172,761 A * 10/1979 Raven .................... G21C 3/344
  376/441
5,416,812 A   5/1995 Matzner

FOREIGN PATENT DOCUMENTS

| JP | 55-10541 | 1/1980 |
| JP | 62-105082 A | 5/1987 |
| JP | 62-145192 A | 6/1987 |
| JP | 6-342092 A | 12/1994 |

(Continued)

OTHER PUBLICATIONS

Japanese Language Office Action issued in counterpart Japanese Application No. 2012-285092 dated Mar. 15, 2016 with English translation (6 pages).

*Primary Examiner* — Sean P Burke
(74) *Attorney, Agent, or Firm* — Crowell & Moring LLP

(57) ABSTRACT

In a fuel assembly, a plurality of fuel rods are arranged in an array of 10 rows and 10 columns in the cross section of the fuel assembly. A flow resistance member is disposed in a central portion in the cross section at upper end portions of partial length fuel rods which are a part of the fuel rods. In the flow resistance member, resistance members are each disposed between ferrules arranged in an array of 6 rows and 6 columns in the diagonal direction of the flow resistance member. Resistance members are each disposed between the ferrules in a peripheral portion of the flow resistance member. By disposing the resistance members, the pressure loss in an inner region in the cross section of the fuel assembly is increased, and the flow rate of a gas-liquid two-phase flow in an outer region surrounding the inner region is increased.

2 Claims, 7 Drawing Sheets

(56) References Cited

FOREIGN PATENT DOCUMENTS

| JP | 11-30681 A | 2/1999 |
|---|---|---|
| JP | 2001-318182 A | 11/2001 |
| JP | 2005-49196 A | 2/2005 |
| JP | 2005-49256 A | 2/2005 |
| JP | 2006-343275 A | 12/2006 |
| JP | 2010-145232 A | 7/2010 |
| JP | 2010145232 A * | 7/2010 |

* cited by examiner

FUEL ASSEMBLY

CLAIM OF PRIORITY

The present application claims priority from Japanese Patent application serial no. 2012-285092, filed on Dec. 27, 2012, the content of which is hereby incorporated by reference into this application.

BACKGROUND OF THE INVENTION

Technical Field

The present invention relates to a fuel assembly and, in particular, to a fuel assembly suitable for plying to a boiling water nuclear reactor.

Background Art

A plurality of fuel assemblies are loaded in a core of a boiling water nuclear reactor. Each fuel assembly has a fuel bundle disposed in a square tubular channel box. Each fuel bundle has a plurality of fuel rods in which a plurality of fuel pellets containing uranium are disposed, an upper tie plate which supports upper end portions of the fuel rods, a lower tie plate which supports lower end portions of the fuel rods, and a plurality of spacers, each of which maintains space among the fuel rods. One example of the fuel spacer is disclosed in Japanese Patent Laid-Open No. 62(1987)-105082. In general, these fuel spacers are disposed at predetermined intervals in the axial direction of the fuel assembly for the purpose of holding the fuel rods for preventing the fuel rods from bending or the like. In the boiling water nuclear reactor, cooling water boils in each fuel assembly loaded in the core of the reactor, and a part of the cooling water is converted into steam, and a gas-liquid two-phase flow containing the cooling water and steam goes up in the fuel assembly. The steam contained in the gas-liquid two-phase flow is separated from the cooling water by a steam-water separator and a steam dryer in the nuclear reactor. The separated steam is supplied from the nuclear reactor to a turbine connected to an electric generator.

If a surface of the fuel rod is in a state of being covered with a liquid film of the cooling water in the core, heat removal from the fuel rod is soundly achieved. However, if the surface of the fuel rod is in a state of being in contact with steam constantly, heat removal from the fuel rod is carried out poorly, and as a result, the surface temperature of the fuel rod is increased. In order to prevent this increase in the surface temperature, it is necessary to bring the surface of the fuel rod to a state where the liquid film is present on the surface constantly.

In an upper portion of the fuel assembly where the ratio of steam contained in the gas-liquid two-phase flow is increased, the liquid film is formed on each surface of the fuel rods, and a phenomenon called an annular-dispersed flow in which steam and liquid droplets are present occurs between the fuel rods. The gas-liquid two-phase flow goes up between the fuel rods while the adhesion of the liquid droplets in the steam to the liquid film on the surface of the fuel rod, and the scattering of the liquid droplets into the steam from the liquid film are repeated. In order to maintain the liquid film formed on the surface of the fuel rod, it is only necessary that the liquid droplets can actively adhere to the liquid film from the steam. As a result, it is possible to improve the thermal margin of the fuel assembly.

The fuel spacers have a function of disturbing the flow of the gas-liquid two-phase flow going up a cooling water path formed between the fuel rods, and therefore, an effect of allowing the liquid droplets in the steam to adhere to the liquid film on the surface of the fuel rod is enhanced. However, the mechanism of disturbing the gas-liquid two-phase flow in the cooling water path by the fuel spacer causes a large pressure loss. This large pressure loss causes a decrease in the flow rate of the cooling water going up in the fuel assembly. The pressure loss of the fuel spacer is related to a projected area of the fuel spacer closing the cooling water path. Due to this, the thermal margin of the fuel assembly was tried to be improved by disturbing the flow of the gas-liquid two-phase flow in the fuel assembly while decreasing the pressure loss by decreasing the projected area of the fuel spacer to the cooling water path.

Further, in the fuel assembly in which a part of the plurality of fuel rods are substituted with partial length fuel rods, the pressure loss of the fuel assembly is decreased by the use of the partial length fuel rods. By using the partial length fuel rods, a space where fuel rods are not present is formed on an upper side of the upper ends of the partial length fuel rods in the fuel assembly to decrease the pressure loss, and thus, the cooling water easily flows in the fuel assembly. However, the adoption of the partial length fuel rods increases the amount of liquid droplets flowing along with steam from the fuel assembly.

In the fuel assembly described in Japanese Patent Laid-Open No. 2010-145232, partial length fuel rods are disposed in an outermost layer of a fuel rod array and an inner region which is a region on the inner side excluding a second layer from the inner surface of a channel box, and a partial fuel spacer having a size smaller than reference fuel spacers in the direction perpendicular to the center axis of the fuel assembly is disposed on the upper side of the upper ends of the partial length fuel rods in an inner region where these partial length fuel rods are disposed. The reference fuel spacers support all the fuel rods in the fuel assembly. On the other hand, the partial fuel spacer supports fuel rods, which are a part of all the fuel rods in the fuel assembly and are disposed in the inner region. The partial fuel spacer allows liquid droplets present in a space on the upper side of the partial length fuel rods to adhere to a liquid film on the surface of the fuel rod to decrease the amount of liquid droplets flowing out to the outside of the fuel assembly. Further, the increase in the pressure loss of the fuel assembly is minimized by disposing the partial fuel spacer.

In the fuel assembly described in Japanese Patent Laid-Open No. 2001-318182, it is intended to increase the dry out margin of fuel rods and to decrease the pressure loss of the fuel assembly by supporting a plurality of fuel rods by two types of fuel spacers. These two types of fuel spacers are a fuel spacer having a low pressure loss and a fuel spacer having a large mixing effect. The latter fuel spacer includes blades for swirling cooling water attached to each grid plate in the vicinity of each intersection of the orthogonally provided grid plates. The former fuel spacer is not provided with such blades and achieves the decrease of a pressure loss. The fuel spacer having a low pressure loss and the fuel spacer having a large mixing effect are alternately arranged in the axial direction of the fuel assembly.

Further, a water gap region (a region on the outer side of a channel box) in which saturated water is present is formed between the adjacent fuel assemblies loaded in the core, and a gas-liquid two-phase flow is present in the fuel assembly. Therefore, neutrons generated by nuclear fission of a fissile material in the fuel rods are easily moderated in the water gap region. Many of the neutrons causing nuclear fission of U-235 are supplied to the inside of the fuel assembly from the water gap region. As a result, the power in an outer peripheral portion in a cross section of the fuel assembly (a cross section in the direction perpendicular to the center axis of the fuel assembly) is increased. Since a thermal margin in this outer peripheral portion is not enough, in a fuel assembly of a general boiling water nuclear reactor, the uranium enrichment in the fuel rods disposed in the outer peripheral portion is lower than that in the fuel rods disposed in the inner side. In the cross section of each fuel assembly loaded in the core of a general boiling water nuclear reactor, the ratio of the average uranium enrichment in the outer peripheral portion in the cross section thereof to the average uranium enrichment in the cross section thereof is 0.9 or less. On the other hand, if the thermal margin of the fuel assembly can be ensured, the enrichment of the fissile material in the fuel assembly can be increased, and thus, the inventory of the fissile material can be increased.

CITATION LIST

Patent Literature

[Patent Literature 1] Japanese Patent Laid-Open No. 62(1987)-105082
[Patent Literature 2] Japanese Patent Laid-open No. 2010-145232
[Patent Literature 3] Japanese Patent Laid-Open No. 2001-318182

SUMMARY OF THE INVENTION

Technical Problem

In the boiling water nuclear reactor, as described above, it is necessary to improve the thermal margin in an outer peripheral portion in the cross section of the fuel assembly in order to increase the inventory of a fissile material in the fuel assembly to be loaded in the core. At this time, it is considered acceptable not to improve the thermal margin in an inner region in the cross section of the fuel assembly. That is, by focusing on the outer peripheral portion in the cross section of the fuel assembly, there is a problem that the effect of improving the thermal margin is limited.

The fuel assembly described in Japanese Patent Laid-Open No. 2010-145232 has a partial fuel spacer as described above. This partial fuel spacer is used along with a reference spacer by decreasing the pressure loss as much as possible. The partial fuel spacer described in Japanese Patent Laid-Open No. 2010-145232 has a small pressure loss, and plays a role in closing the cooling water path in the inner region in the cross section of the fuel assembly, and therefore, the flow rate of the cooling water in the outer peripheral portion can be increased. However, since the projected area of the partial fuel spacer for closing the cooling water path is small, the effect of increasing the flow rate of the cooling water in the outer peripheral portion is not enough. Further, the partial fuel spacer is disposed on the upper side of the upper ends of the partial length fuel rods in the axial direction of the fuel assembly. Since a region on the upper side of the upper ends of the partial length fuel rods is a region where an annular dispersed flow occurs, the disposition of the partial fuel spacer on the upper side of the upper ends of the partial length fuel rods is suitable for allowing liquid droplets in steam to adhere to the liquid film on the surface of the fuel rod. However, in the case where the partial fuel spacer is disposed on the upper side of the upper ends of the partial length fuel rods, an effect of increasing the flow rate of the cooling water flowing in the outer peripheral portion is decreased.

An object of the present invention is to provide a fuel assembly, in which even in a case where inventory of a fissile material in fuel rods disposed in an outermost layer of a fuel rod array is increased, thermal margin of the fuel rods disposed in the outermost layer can be improved.

Solution To Problem

A feature of the present invention for attaining the above object is a fuel assembly comprising a plurality of fuel rods containing a fissile material; a lower tie plate which supports each lower end portion of the fuel rods; an upper tie plate which holds each upper end portion of the fuel rods; a plurality of fuel spacers, each of which bundles the plurality of fuel rods; a channel box attached to the upper tie plate, extending toward the lower tie plate, and surrounding the plurality of fuel rods bundled by the fuel spacers; and a flow resistance member, which is disposed in an inner side of an outermost layer region of an array of the plurality of fuel rods in a cross section in a direction perpendicular to a center axis of the channel box, and through which coolant paths are formed, and which the fuel rods penetrate, wherein when the number of the fuel rods held by the flow resistance member is R, the number of all the fuel rods in the fuel assembly is A, and a projected area ratio C of projected area Sa of the flow resistance member from an upper tie plate side to projected area Sb of the fuel spacer which holds all the fuel rods in the fuel assembly from the upper tie plate side is defined by the following formula (1), the projected area ratio C is within a range of 1.5 to 5.2.

$$C=(Sa/Sb)\times(A/R) \qquad (1)$$

Since the projected area Sa of the flow resistance member from the upper tie plate side is 1.5 to 5.2 times of the projected area Sb of the fuel spacer which holds all the fuel rods in the fuel assembly from the upper tie plate side, even in the case where inventory of a fissile material in fuel rods disposed in the outermost layer region is increased, the flow rate of coolant flowing in the outermost layer region at the upper tie plate side than the flow resistance member is increased. Thus, critical power ratio of the fuel rods disposed in the outermost layer region can be increased, and as a result, the thermal margin of the fuel rods disposed in the outermost layer region can be improved.

Advantageous Effect of the Invention

According to the present invention, even in the case where inventory of a fissile material in fuel rods disposed in the outermost layer of a fuel rod array is increased, the thermal margin of the fuel rods disposed in the outermost layer can be improved.

DETAILED DESCRIPTION OF THE PREFERRED EMBODIMENTS

Figure 1:
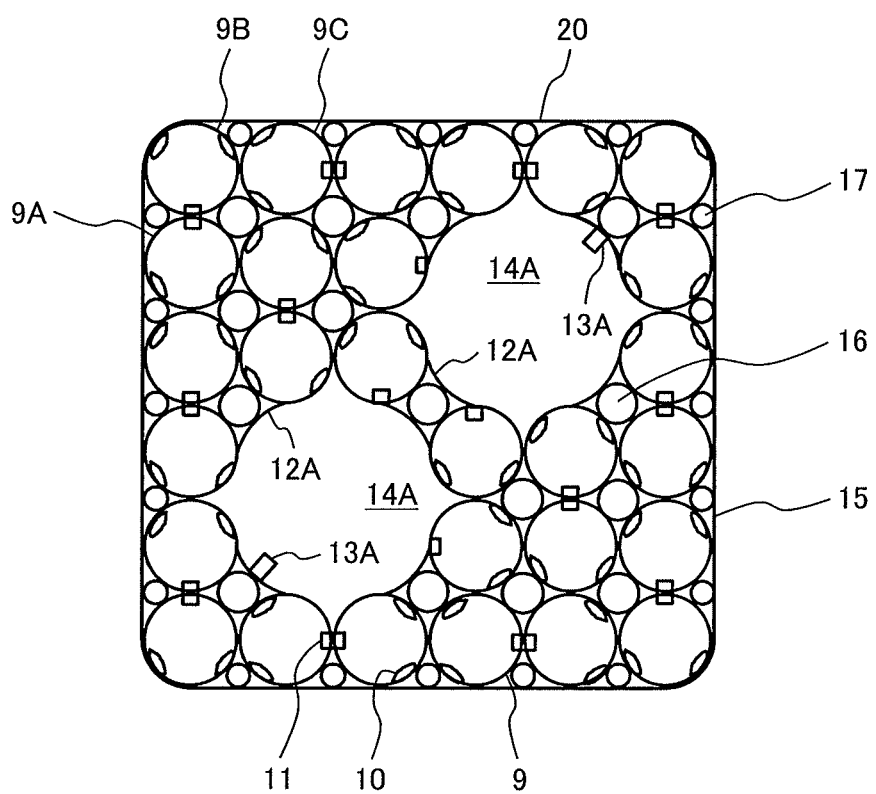
FIG. 1 is a top view showing a flow resistance member used in a fuel assembly according to embodiment 1 which is a preferred embodiment of the present invention.

The inventors studied the improvement of burnup efficiency of a fissile material of a fuel assembly. As described above, since cooling water is present more in a water gap region on the outer side of the channel box than in the channel box, it is most efficient to burn a fissile material in the fuel rods disposed in the outermost layer adjacent to the channel box in the fuel rod array in the fuel assembly. In a case where the inventory of a fissile material is increased in the fuel rods disposed in the outermost layer, the thermal margin of these fuel rods is deteriorated. Therefore, measures for improving the thermal margin of the fuel rods disposed in the outermost layer were examined. The reason why the thermal margin of the fuel rods disposed in the outermost layer is decreased is because the liquid film present on the surfaces of the fuel rods is converted into steam due to a large amount of heat generation and the amount of water to cool the fuel rods is decreased. The inventors concluded that since the amount of cooling water in the outermost layer region of the fuel rod array in the fuel assembly can be increased by controlling the flow of the cooling water in the fuel assembly, the above problem can be solved by providing a flow resistance member in a central portion in the cross section of the fuel assembly.

However, a fuel spacer disposed in the inside of the conventional fuel assembly acts as a flow resistance in a central portion in the cross section of this fuel assembly. That is, in the fuel assembly described in Japanese Patent Laid-open No. 2010-145232, the partial fuel spacer functions as a flow resistance member in a central portion in the cross section of the fuel assembly. On the other hand, since the fuel spacer is designed so as to decrease the flow resistance as much as possible, the effect of the fuel spacer as the flow resistance is small. Further, since the fuel spacer which does not hold all the fuel rods in the fuel assembly does not sufficiently play a role in holding the fuel rods, such a spacer is used as a supplementary member added to the fuel spacer which holds all the fuel rods in the fuel assembly having the present holding mechanism. This point is the same as in the present invention, however, an increase in pressure loss due to the addition of such a fuel spacer decreases the flow rate of cooling water in the fuel assembly, and thus the critical power is decreased. Unless an effect of increasing the critical power overtaking the decrease in the flow rate of cooling water due to an increase in resistance is obtained, it cannot be said that a true effect of increasing the critical power is obtained.

In order to quantitatively show these effects, the inventors examined the critical power performance when the cross section (the projected area from the upper tie plate side of the fuel assembly) of the flow resistance member disposed in a central portion in the cross section of the fuel assembly was changed. The examination results will be described below.

When this examination was performed, the following fuel assembly was assumed. First, in the case of using a square-shaped flow resistance member as shown in FIG. 1, in which the projected area from the upper tie plate side occupies about one-third of the projected area of a fuel spacer (for example, a fuel spacer 6 shown in FIG. 3), which holds all the fuel rods in the fuel assembly, from the upper tie plate side, the projected area of the reference fuel spacer is used as reference, and the projected area ratio C is defined as 1.0. Unless otherwise stated, the projected area described below refers to a projected area from the upper tie plate side. Further, as for the power of the fuel rods in the fuel assembly, a case where the relative power of the fuel rods disposed in the outermost layer in the fuel rod array is 1.2 was assumed. The relative power of the fuel rods disposed in the outermost layer in the fuel rod array being 1.2 can be achieved by increasing the average enrichment in the outermost layer of the fuel rod array as compared with the average enrichment in the cross section of the fuel assembly in a region filled with enriched uranium in the fuel assembly. Further, the increment of the pressure loss due to an increase in the projected area of the flow resistance member is treated as a decrement of the flow rate of the coolant.

Figure 4:
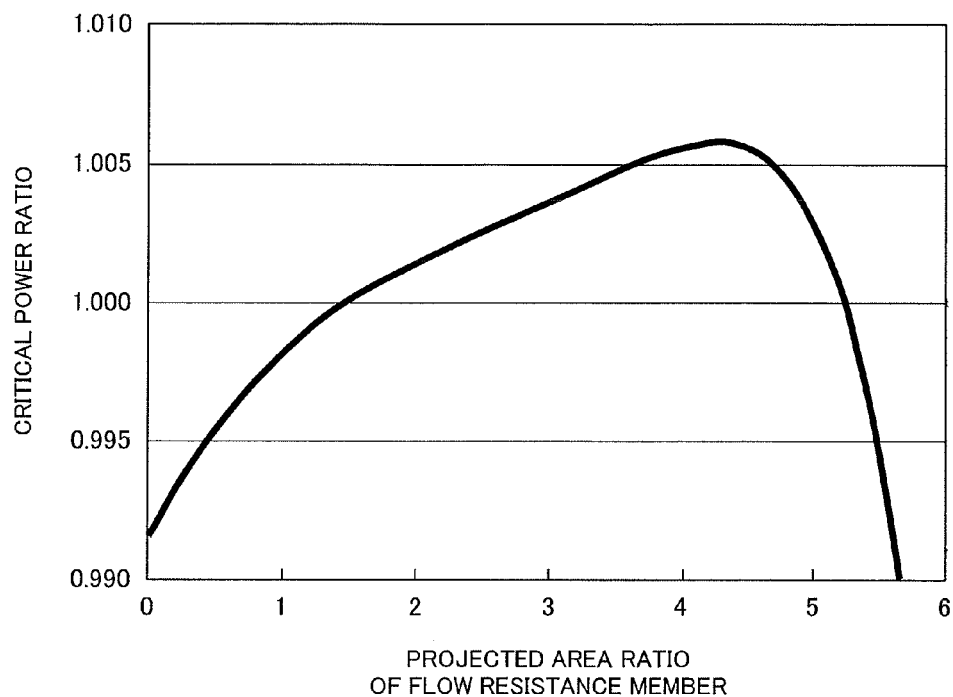
FIG. 4 is a characteristic drawing showing a change in critical power ratio with respect to projected area rate of a flow resistance member.

The critical power ratio indicated by a vertical axis shown in FIG. 4 shows the critical power ratio of the fuel assembly in a case where a flow resistance member having a projected area one-third of the projected area of the above-described reference fuel spacer is used. The projected area ratio C indicated by a horizontal axis shown in FIG. 4 is a rate of the projected area of the flow resistance member to the projected area of the reference fuel spacer, that is, the fuel spacer which holds all the fuel rods used in the fuel assembly including the flow resistance member. This projected area ratio C of the flow resistance member is defined by the formula (1).

$$C = (Sa/Sb) \times (A/R) \qquad (1)$$

In the formula (1), Sa is the projected area of the flow resistance member, Sb is the projected area of the fuel spacer (reference fuel spacer) used in the fuel assembly to which the flow resistance member is applied, R is the number of the fuel rods held by the flow resistance member, and A is the number of all the fuel rods in the fuel assembly to which the flow resistance member is applied.

FIG. 4 shows a change in the critical power ratio of the fuel assembly using the flow resistance member with respect to the projected area rate of the flow resistance member. In the case where the power of the fuel rods in the outermost layer of the fuel rod array of the fuel assembly is high, the amount of cooling water in the outermost layer of the fuel rod array can be increased by increasing the flow resistance in a central portion in the cross section of the fuel assembly and the critical power of the fuel rods disposed in the outermost layer is increased. In particular, when the projected area ratio of the flow resistance member is in a range of 1.5 to 5.2, the critical power is increased as compared with the conventional art.

As a result, the inventory of a fissile material (for example, uranium-235) in the fuel rods disposed in the outermost layer can be increased within the range of the increment of the critical power, and thus, economic efficiency of fuel can be improved.

Hereinafter, embodiments of the present invention reflecting the above examination results will be described.

[Embodiment 1]

A fuel assembly according to embodiment 1 which is a preferred embodiment of the present invention, applied to a boiling water nuclear reactor, will be described in detail with reference to FIGS. 1 to 3.

Figure 2:
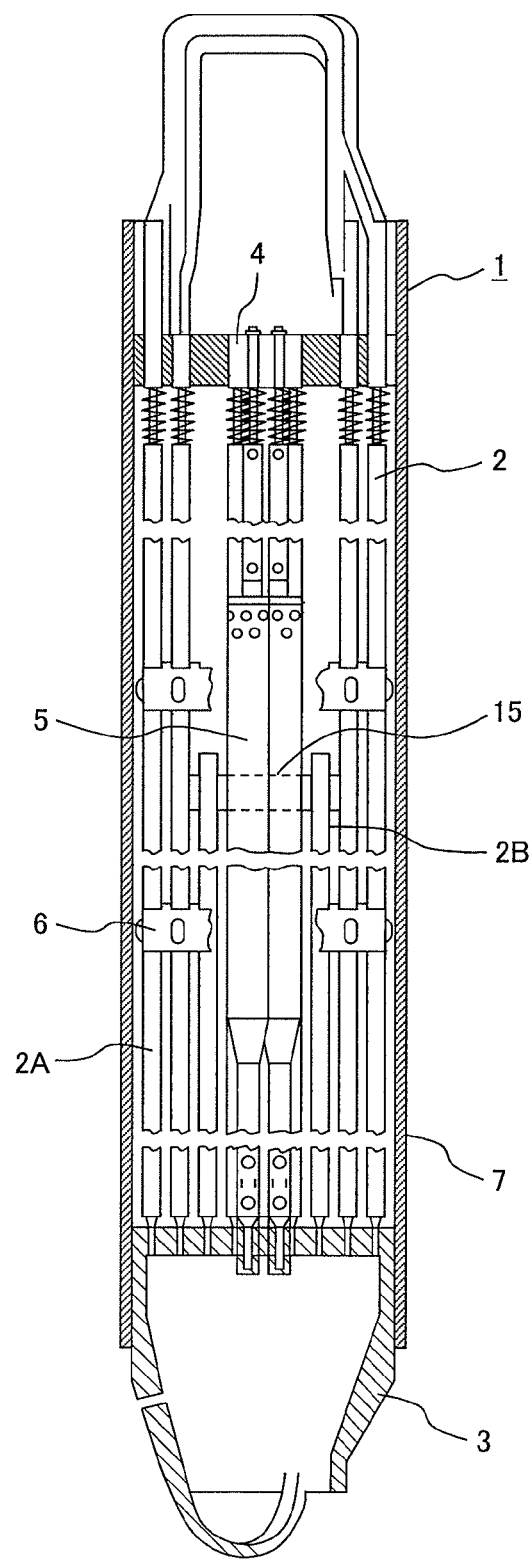
FIG. 2 is a longitudinal sectional view showing a fuel assembly according to embodiment 1 of the present invention to which a flow resistance member shown in FIG. 1 is applied.

A fuel assembly 1 according to the present embodiment is provided with a plurality of fuel rods 2, an upper tie plate 4, a lower tie plate 3, a plurality of fuel spacers 6, a plurality of water rods 5, a channel box 7, and a flow resistance member 15 (see FIG. 2). Each of the fuel rods 2 has a hermetically sealed fuel cladding (not shown) and this sealed fuel cladding is filled with a plurality of fuel pellets (not shown) each containing a fuel material. The plurality of fuel rods 2 include a plurality of fuel rods 2A and a plurality of partial length fuel rods 2B having a length shorter in the axial direction than the fuel rods 2A. The lower tie plate 3 supports a lower end portion of each of the fuel rods 2, and the upper tie plate 4 holds an upper end portion of each of the fuel rods 2A. These fuel rods 2 are disposed in an array of 10 rows and 10 columns in the cross section (the cross section in the direction perpendicular to the center axis of the fuel assembly, that is, the center axis of the channel box) of the fuel assembly 1. In a central portion in the cross section, two water rods 5, each of which has a cross-sectional area occupying a region capable of disposing four fuel rods 2, are disposed. Each water rod 5 is a water rod with a large diameter. The lower end portions of these water rods 5 are supported by the lower tie plate 3, and the upper end portions thereof are held by the upper tie plate 4. The plurality of fuel spacers 6 are disposed at predetermined intervals in the axial direction of the fuel assembly 1, and hold the fuel rods 2 and the water rods 5 such that a cooling water path through which cooling water flows is formed between the fuel rods 2 and between the fuel rod 2 and the water rod 5. The square tubular channel box 7 having a square-shaped cross section is attached to the upper tie plate 4 and extends toward the lower tie plate 3. The respective fuel rods 2 bundled by the fuel spacers 6 are disposed in the channel box 7. Incidentally, an outer width of the channel box 7 is about 15 cm, an outer diameter of the fuel rod 2 is about 1.0 cm, and an outer diameter of the water rod 5 is about 2.5 cm. The length of the region where the fuel pellets containing fissile uranium are filled in the fuel rod 2 according to the present embodiment, that is, a fuel effective length in the present embodiment is 3.8 m.

When the fuel assembly 1 was loaded in the core of a boiling water nuclear reactor, one corner of the fuel assembly 1 is disposed facing a control rod which has a cross-shaped cross section. The channel box 7 is attached to the upper tie plate 4 by a channel fastener (not shown). The channel fastener has a function of maintaining a gap with a width required between the fuel assemblies 1 when the fuel assemblies 1 were loaded in the core, so that the control rod can be inserted between the fuel assemblies 1. Due to this, the channel fastener is attached to the upper tie plate 4 such that it is disposed at a corner of the fuel assembly facing the control rod. In other words, the corner portion facing the control rod CR of the fuel assembly 1 is a corner portion to which the channel fastener is attached. Each of the fuel pellets filled in each of the fuel rods 2 is produced by using uranium dioxide which is nuclear fuel material, and contains uranium-235 which is a fissile material.

Figure 3:
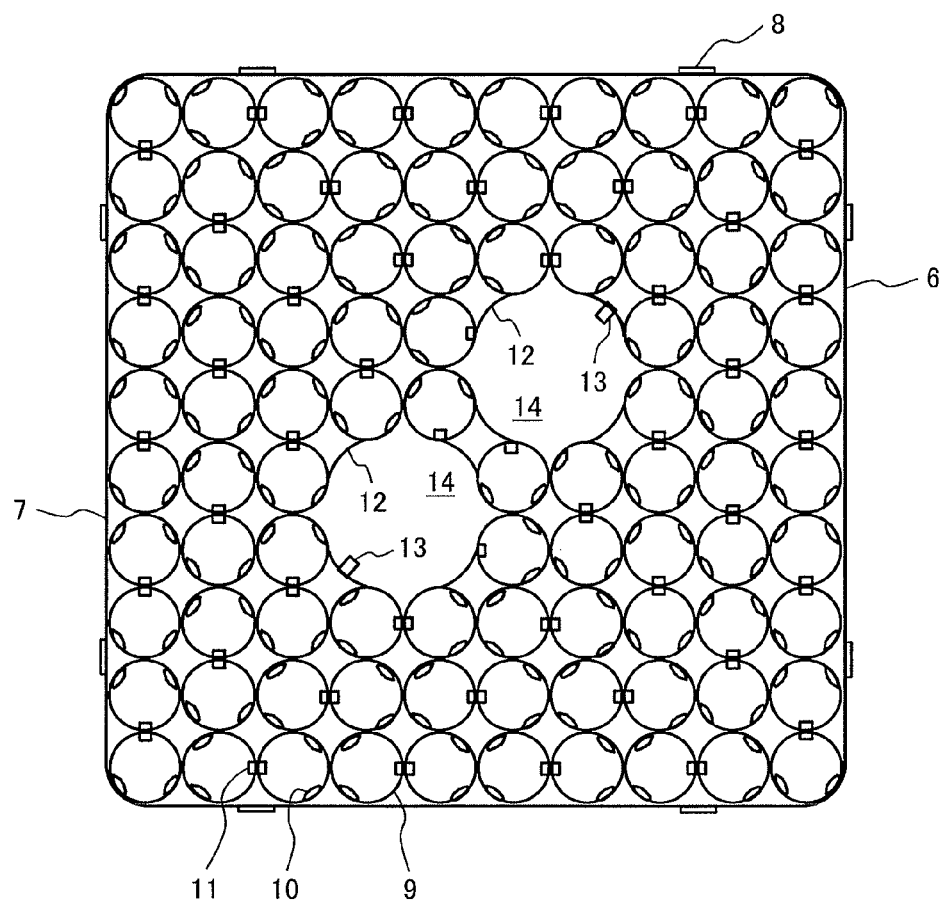
FIG. 3 is a top view of a fuel spacer shown in FIG. 2.

Each of the fuel spacers 6 disposed in the axial direction of the fuel assembly 1 is a ferrule-type fuel spacer, and includes a square-shaped band 7 having a plurality of spacer tabs 8 formed thereon, and ferrules 9 whose number is the same as that of the fuel rods 2 (see FIG. 3). Each of the ferrules 9 is a cylinder and are arranged in an array of 10 rows and 10 columns in the same manner as the fuel rods 2, and adjacent ferrules 9 are joined to each other by welding. The square-shaped band 7 is disposed surrounding the periphery of the ferrules 9 disposed in the outermost layer among the ferrules 9 arranged in a square grid of 10 rows and 10 columns, and joined to the ferrules 9 disposed in the outermost layer by welding. In each of the ferrules 9, two protrusions (fixing support members) 10 are formed at both end portions such that a part of the ferrule 9 is protruded inward. A spring member (elastic support member) 11 is provided across adjacent pair of ferrules 9 and attached thereto. In a central portion in the cross section of the fuel spacer 6, two water rod disposition regions 14, each of which occupies a region capable of disposing four ferrules 9, are formed. A bridge member 12 is provided every two adjacent ferrules 9 facing the water rod disposition region 14 and attached to a side surface of each ferrule 9. The spring member 13 serving as the elastic support member is attached to one bridge member 12 among the four bridge members 12 facing each of the water rod disposition regions 14.

Each of the fuel spacers 6 is disposed in the channel box 7, and each of the spacer tabs 8 provided on the band 7 comes into contact with the inner surface of the channel box 7. Each of the fuel rods 2 arranged in an array of 10 rows and 10 columns is inserted one by one into each of the ferrules 9 of the fuel spacer 6, and supported by three support members including the two protrusions 10 formed in each ferrule 9 and the spring member 11 provided in each ferrule 9 disposed in the circumferential direction of the fuel rod 2. The plurality of partial length fuel rods 2B among the fuel rods 2 are disposed in a region (inner region) on the inner side of the respective fuel rods 2 annularly disposed in the shape of a square in the second layer from the channel box 7 toward the center axis of the fuel assembly 1 in the fuel rod array of 10 rows and 10 columns. These partial length fuel rods 2B are supported as described above by the other fuel spacers 6 except for the fuel spacer 6 disposed closest to the upper tie plate 4. Incidentally, the upper end portions of the partial length fuel rods 2B are not supported by the upper tie plate 4. All the fuel rods 2A are supported by all the fuel spacers 6. The two water rods 5 are separately inserted into the two water rod disposition regions 14 formed in each of the fuel spacers 6. Notches are attached to the outer surface of the water rod 5 at predetermined intervals in the axial direction of the water rod 5. Each of the notches protrudes in the radial direction of the water rod 5 from the outer surface of the water rod 5, and the number of the notches is the same as the total number of the fuel spacers 6 and the flow resistance member 15. Each of the fuel spacers 6 is supported by the water rods 5 by supporting one bridge member 12 facing one water rod disposition region 14 by the notches of the water rods 5 through a known method. Each of the water rods 5 disposed in each of the water rod disposition regions 14 is pressed against the other bridge member 12 by the spring member 13 to limit the movement in the direction perpendicular to the axis of the fuel assembly 1.

The flow resistance member 15 will be described in detail with reference to FIG. 1. In the flow resistance member 15, a plurality of ferrules 9 are arranged in a square grid of 6 rows and 6 columns in a square-shaped band 20, and in the same manner as the fuel spacer 6, two water rod disposition regions 14A, each of which occupies a region capable of disposing four ferrules 9, are formed in the central portion in the cross section. The adjacent ferrules 9 are joined to each other by welding, and each of the ferrules 9 disposed in the outermost layer is joined to the band 20 by welding. In each of the ferrules 9, two protrusions 10 are formed in the circumferential direction in the same manner as the ferrules 9 of the fuel spacer 6, and a spring member 11 is provided across adjacent pair of ferrules 9 and attached thereto. A bridge member 12A is provided every two adjacent ferrules 9 facing the water rod disposition region 14A and attached to a side surface of each ferrule 9. A spring member 13A serving as the elastic support member is attached to one bridge member 12A among the four bridge members 12A facing each of the water rod disposition regions 14A.

The flow resistance member 15 further includes a plurality of resistance members 16 and a plurality of resistance members 17. When the distance from the center of a given ferrule 9A to the center of a ferrule 9B which is adjacent to and comes into contact with the ferrule 9A is taken as 1, the distance from the center of the ferrule 9A to the center of a ferrule 9C which is adjacent to and comes into contact with the ferrule 9B in the direction orthogonal to the straight line connecting the center of the ferrule 9A to the center of the ferrule 9B is $\sqrt{2}$. The ferrule 9A and the ferrule 9C do not come into contact with each other, and a space is formed between the ferrule 9A and the ferrule 9C. In this manner in each first space (for example, a space formed between the ferrule 9A and the ferrule 9C) formed between two ferrules 9 adjacent to each other in the diagonal direction of the flow resistance member 15, that is, in the diagonal direction of the channel box 7, the resistance member 16 is disposed. Each of the resistance members 16 is a round plate-shaped member made of a zirconium alloy, and comes into contact with each side surface of the adjacent four ferrules 9 and is fixed by welding to the side surfaces of these ferrules 9. Each of the resistance members 17 is a round plate-shaped member made of a zirconium alloy, and is disposed in each second space formed by the band 20 and adjacent two ferrules 9 and comes into contact with the band 20 and these ferrules 9. The diameter of the resistance member 17 is smaller than that of the resistance member 16. The resistance member 17 disposed in the second space comes into contact with the side surface of each of the two ferrules 9 in contact with each other forming the second space and the inner surface of the band 20 and fixed thereto by welding.

One flow resistance member 15 is disposed at a position closer to the lower tie plate 3 than the fuel spacer 6 disposed at a position closest to the upper tie plate 4 in the axial direction of the fuel assembly 1 and is disposed at a position of one end portion of the partial length fuel rod 2B opposite to the other end portion thereof held by the lower tie plate 3. The flow resistance member 15 is supported by the water rods 5 by supporting one bridge member 12A facing one water rod disposition region 14A by the notches of the water rods 5 through a known method in the same manner as the fuel spacer 6. Each of the water rods 5 disposed in each of the water rod disposition regions 14A is pressed against the other bridge member 12A by the spring member 13A to limit the movement in the direction perpendicular to the axis of the fuel assembly 1. Further, the flow resistance member 15 is disposed in an inner region which is on the inner side of each of the fuel rods 2A annularly disposed in the shape of a square in the second layer from the outside of the fuel rod array of 10 rows and 10 columns in the cross section of the fuel assembly 1, that is, on the inner side of the outermost layer of the fuel rod array of 10 rows and 10 columns. Each of the resistance members 16, each of which increases the flow resistance in a central portion in the cross section of the fuel assembly 1, and each of the resistance members 17 are disposed in the above-described inner region. Each of the ferrules 9 of the flow resistance member 15 is disposed directly above the other ferrules 9 disposed on the inner side of each of the ferrules 9 annularly disposed in the shape of a square in the second layer from the band 7 of the fuel spacer 6 disposed directly below the flow resistance member 15 toward the inner side. Each of the fuel rods 2A and 2B disposed in the inner region is inserted into each of the ferrules 9 of the flow resistance member 15.

The projected area Sa of the flow resistance member 15 is $Sa_1$ mm$^2$, and the projected area Sb of the fuel spacer 6 which is a reference fuel spacer holding all the fuel rods 2 in the fuel assembly 1 is $Sb_1$ mm$^2$ ($>Sa_1$ mm$^2$). Further, the number R of the fuel rods 2 held by the flow resistance member 15 is 28, and the number A of all the fuel rods 2 in the fuel assembly 1 is 92. By substituting each of the values of these Sa, Sb, R, and A in the formula (1), the projected area ratio C $(=(Sa_1/Sb_1)\times(92/28))$ of the flow resistance member 15 is obtained. This projected area ratio C is 2.0.

The length of one side of the square-shaped band 20 of the flow resistance member 15 is 60% of the length of one side of the square-shaped band 7 of the fuel spacer 6, and the cross-sectional area of the flow resistance member 15 is about one-third of the cross-sectional area of the fuel spacer 6.

In the fuel assembly 1 according to the present embodiment, the average enrichment in the cross-sectional area of the fuel assembly 1 is about 4.6 wt %, and the average enrichment in all the fuel rods 2A disposed in the outermost layer of the fuel rod array of 10 rows and 10 columns is about 5.6 wt %. In this manner, in the fuel assembly 1, the inventory of a fissile material in the outermost layer is increased.

When operating a boiling water nuclear reactor having a core in which a plurality of fuel assemblies 1 are loaded, cooling water is supplied to the core and goes up in each of the fuel assemblies 1. The cooling water in the fuel assembly 1 is heated by heat generated by nuclear fission of uranium-235 which is a fissile material in the fuel rods 2 and a part of the cooling water is converted into steam. Then, a gas-liquid two-phase flow containing steam and cooling water goes up in the fuel assembly 1. The percentage of the steam contained in the gas-liquid two-phase flow is progressively increased toward the upper end portion in the fuel assembly.

The flow of the gas-liquid two-phase flow having passed through the fuel spacer 6 disposed second from the upper tie plate 4 among all the fuel spacers 6 in the channel box 7 is divided into a gas-liquid two-phase flow flowing in each ferrule 9 of the flow resistance member 15 and a gas-liquid two-phase flow flowing in a region present between an inner surface of the channel box 7 and the band 20 of the flow resistance member 15. Since the pressure loss of the flow resistance member 15 provided with the resistance members 16 and 17 is increased, on the upper side of the flow resistance member 15, the flow rate of the gas-liquid two-phase flow per unit area flowing through an outer region (a region present between the inner surface of the channel box 7 and the band 20 of the flow resistance member 15), in which two layers of the fuel rods 2 disposed from the inner surface of the channel box 7 toward the inner side are disposed, is increased. Due to this, in each of the fuel rods 2 disposed in the outer region on the side closer to the upper tie plate 4 than the flow resistance member 15, the amount of the liquid film on the surface of these fuel rods 2 is increased and also the amount of liquid droplets in the steam adhering to the liquid film on the surface thereof is increased. As a result, cooling of each of the fuel rods 2 disposed in the outer region on the side closer to the upper tie plate 4 than the flow resistance member 15 is promoted, and the critical power of these fuel rods 2 is increased, and thus, the thermal margin is increased.

The flow rate of the gas-liquid two-phase flow passing through each of the ferrules 9 of the flow resistance member 15 is decreased, however, a region on the side closer to the upper tie plate 4 than the upper ends of the partial length fuel rods 2B on the side of the flow resistance member 15, that is, a region directly above the upper ends of the partial length fuel rods 2B is a region where an annular dispersed flow increases, and the adhesion of liquid droplets present in the steam in this region to the liquid film on the surfaces of the fuel rods 2 in this region is promoted due to the action of the flow resistance member 15. Due to this, even in the region directly above the upper ends of the partial length fuel rods 2B, cooling of the fuel rods 2 is promoted.

According to the present embodiment, since the projected area ratio of the flow resistance member 15 is 2.0, even if the average enrichment in each of the fuel rods disposed in the outermost layer of the fuel rod array is increased as compared with the average enrichment in the cross section of the fuel assembly 1, the thermal margin of each of the fuel rods 2 disposed in this outermost layer can be improved.

In the present embodiment, the resistance members 16 and 17 are disposed in all the first and second spaces formed among the ferrules 9, however, a part of the resistance members 16 and 17 may be deleted as long as the projected area ratio of the flow resistance member 15 falls within the acceptable range of 1.5 to 5.2.

The flow resistance member 15 may be disposed at any position in the axial direction of the fuel assembly 1 as long as it is in an enriched uranium region in the fuel assembly 1. However, in order to largely improve the thermal margin of the fuel rods 2 disposed in the outermost layer of the fuel rod array, it is preferred to dispose the flow resistance member 15 on the lower side of the upper end of the partial length fuel rod 2B.

[Embodiment 2]

A fuel assembly according to embodiment 2 which is another preferred embodiment of the present invention, applied to a boiling water nuclear reactor, will be described in detail with reference to FIG. 5.

Figure 5:
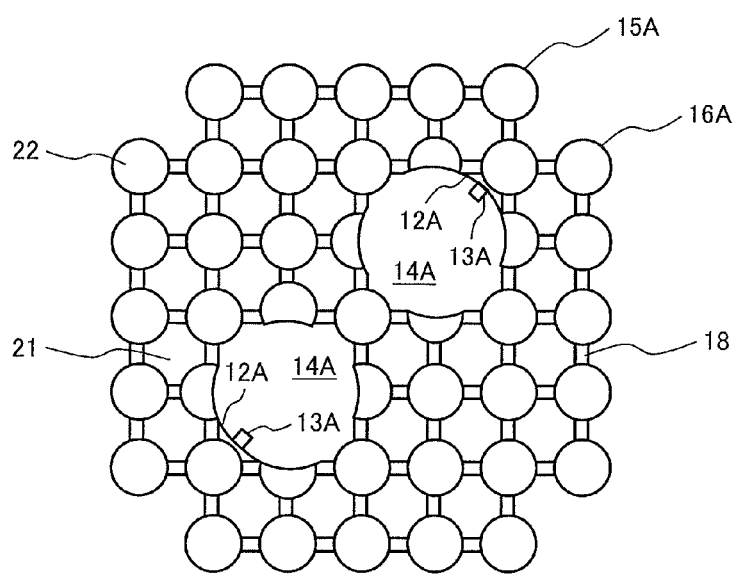
FIG. 5 is a top view showing a flow resistance member used in a fuel assembly according to embodiment 2 which is another preferred embodiment of the present invention.

A fuel assembly according to the present embodiment has a structure that in the fuel assembly 1 of embodiment 1, the flow resistance member 15 is replaced with a flow resistance member 15A (see FIG. 5). The other structures of the fuel assembly according to the present embodiment are similar to the fuel assembly 1 according to embodiment 1.

The flow resistance member 15A is a grid flow resistance member and has a structure in which bridge members 12A are attached to a plate member 22 which includes a plurality of resistance members 16A arranged substantially in a square grid of 7 rows and 7 columns and connection members 18 each connecting the adjacent resistance members 16A to each other. A plurality of connection members 18 are disposed so as to intersect at right angles to form a grid line in conjunction with the resistance members 16A which are a circular plate. Each of the circular resistance members 16A is disposed at each of the intersections of the grid lines of the flow resistance member 15A. Further, the plate member 22 of the flow resistance member 15A having a shape shown in FIG. 5 is formed by processing a plate material made of a zirconium alloy through press working. In the same manner as the flow resistance member 15, two water rod disposition regions 14A are formed in a central portion of the plate member 22 of the flow resistance member 15A. In each of the water rod disposition regions 14A, one bridge member 12A is disposed facing each of the water rod disposition regions 14A and attached to the plate member 22 of the flow resistance member 15A. A spring member 13A which presses a water rod 5 inserted into each of the water rod disposition regions 14A in the horizontal direction is attached to each of the bridge members 12A.

In the flow resistance member 15A, a plurality of fuel rod insertion holes 21 are present and each of the fuel rod insertion holes 21 is formed such that it is surrounded by four resistance members 16A and the four connection members 18 connecting these four resistance members 16A. In the flow resistance member 15A, the resistance members 16A are disposed at the same positions as the resistance members 16 of the flow resistance member 15, and the diameter of the resistance member 16A is larger than that of the resistance member 16. The distance between the adjacent resistance members 16A in the diagonal direction of the flow resistance member 15A is slightly larger than the outer diameter of the fuel rod 2. Due to this, the projected area Sa of the flow resistance member 15A is $Sa_2$ mm$^2$, and is larger than that of the flow resistance member 15 used in embodiment 1 ($Sa_2$ mm$^2$>$Sa_1$ mm$^2$). The respective values of the projected area Sb of the fuel spacer 6 which is a reference fuel spacer, the number R of the fuel rods 2 held by the flow resistance member 15A, and the number A of all the fuel rods 2 in the fuel assembly according to the present embodiment are the same as in embodiment 1. As a result, the projected area ratio C of the flow resistance member 15A obtained according to the formula (1) ($=(Sa_2/Sb_1)\times(92/28)$) is 3.0.

One flow resistance member 15A is disposed in a channel box 7, and disposed at a position of upper end portions of partial length fuel rods 2B in the same manner as the flow resistance member 15 used in embodiment 1. The flow resistance member 15A is supported by water rods 5 inserted into the water rod disposition regions 14A in the same manner as the flow resistance member 15. A plurality of fuel rods 2A and a plurality of fuel rods 2B disposed in an inner region are inserted one by one into each of the fuel rod insertion holes 21. The outer surface of each of the fuel rods inserted into the fuel rod insertion holes 21 comes into contact with each of the resistance members 16A disposed around the fuel rod insertion holes 21. A path through which a gas-liquid two-phase flow flows is formed between the outer surface of the fuel rod 2 inserted into the fuel rod insertion hole 21 and the connection member 18.

When operating a boiling water nuclear reactor in which the fuel assembly according to the present embodiment having the flow resistance member 15A is loaded in a core, in substantially the same manner as in the embodiment 1, the flow of the gas-liquid two-phase flow occurring in this fuel assembly is divided into a gas-liquid two-phase flow flowing in each of the fuel rod insertion holes 21 of the flow resistance member 15A and a gas-liquid two-phase flow flowing in a region present between an inner surface of the channel box 7 and the flow resistance member 15A. Since the pressure loss of the flow resistance member 15A provided with the resistance members 16A and the connection members 18 is increased, on the upper side of the flow resistance member 15A, the flow rate of the gas-liquid two-phase flow per unit area flowing through the above-described outer region is increased. Due to this, cooling of each of the fuel rods 2 disposed in the outer region on the upper side of the flow resistance member 15A is promoted, and the critical power of these fuel rods 2 is increased, and thus, the thermal margin is increased.

The flow rate of the gas-liquid two-phase flow passing through each of the fuel rod insertion holes 21 of the flow resistance member 15A is decreased, however, also in a region just above the upper ends of the partial length fuel rods 2B, cooling of the fuel rods 2 is promoted in the same manner as in the first embodiment.

According to the present embodiment, each effect generated in embodiment 1 can be obtained. Moreover, the flow resistance member 15A is simplified as compared with the flow resistance member 15 constituted by joining a plurality of ferrules 9, and thus, the production thereof is easy.

[Embodiment 3]

A fuel assembly according to embodiment 3 which is other preferred embodiment of the present invention, applied to a boiling water nuclear reactor will be described in detail with reference to FIGS. 6 and 7.

Figure 6:
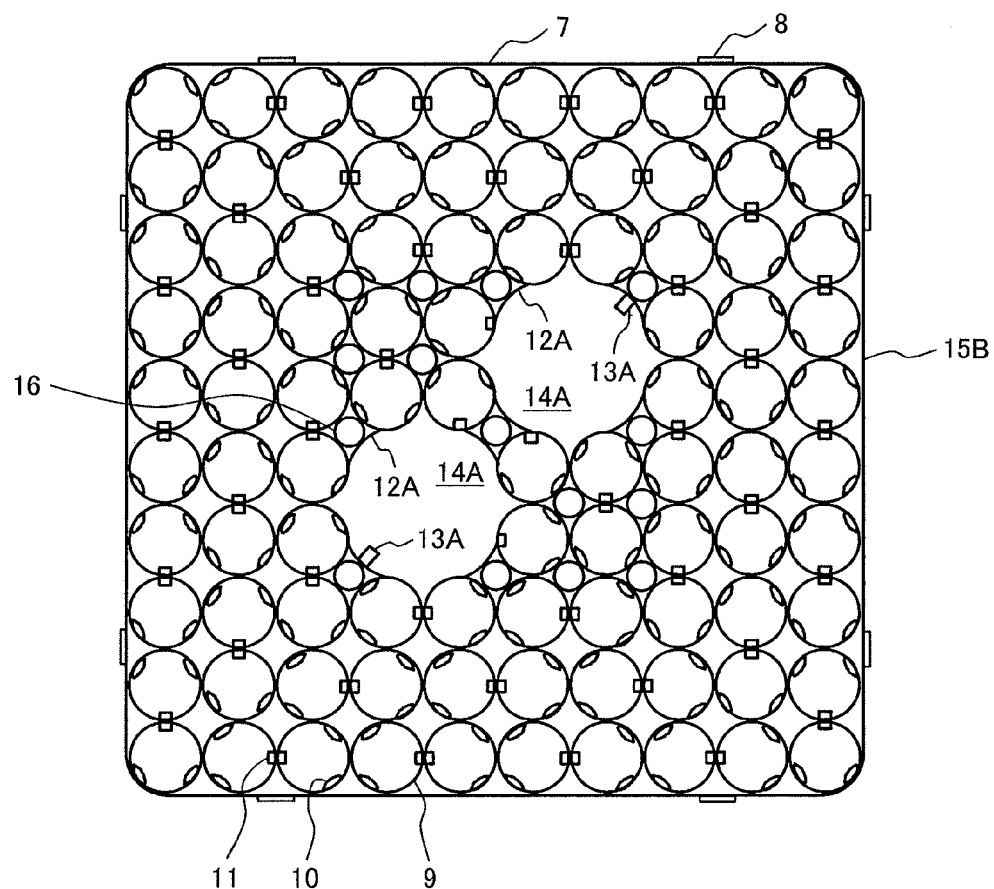
FIG. 6 is a top view showing a flow resistance member used in a fuel assembly according to embodiment 3 which is other preferred embodiment of the present invention.
Figure 7:
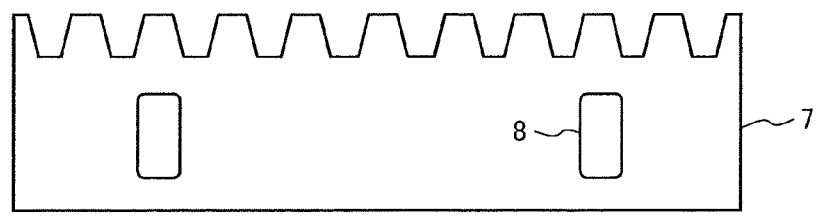
FIG. 7 is a side view showing the flow resistance member shown in FIG. 6.

A fuel assembly according to the present embodiment has a structure in which the flow resistance member 15 in the fuel assembly 1 according to embodiment 1 is replaced with a flow resistance member 15B (see FIG. 6). The other structures of the fuel assembly according to the present embodiment are similar to the fuel assembly 1 according to the embodiment 1.

The flow resistance member 15B has a structure in which the resistance members 16 used in the flow resistance member 15 are provided for the fuel spacer 6. The structure of the flow resistance member 15B excluding the resistance members 16 is the same as that of the fuel spacer 6. Further, the position of each of the resistance members 16 disposed in the flow resistance member 15B is the same as that of each of the resistance members 16 disposed in the flow resistance member 15, and the resistance members 16 are present in the above-described inner region. The projected area Sa of the flow resistance member 15B is $Sa_3$ mm$^2$, and is larger than $Sb_1$ mm$^2$, which is the projected area Sb of the fuel spacer 6 serving as the reference fuel spacer, by the sum of the projected areas of the plurality of resistance members 16. Further, the number R of the fuel rods 2 held by the flow resistance member 15B is 92, and is the same as the number A of all the fuel rods 2 in the fuel assembly according to the present embodiment being 92. The projected area ratio C of the flow resistance member 15B used in the present embodiment obtained according to the formula (1) ($=(Sa_3/Sb_1) \times (92/92)$) is about 2.0.

One flow resistance member 15B is disposed in a channel box 7, and disposed at upper end portions of partial length fuel rods 2B in the axial direction of the fuel assembly in the same manner as the flow resistance member 15 used in the embodiment 1. Each of spacer tabs 8 formed on a band 7 of the flow resistance member 15B comes into contact with the inner surface of the channel box 7. The flow resistance member 15B is supported by water rods 5 inserted into water rod disposition regions 14A in the same manner as the flow resistance member 15. Each of the fuel rods 2 is inserted into each of the ferrules 9 of the flow resistance member 15B.

When operating a boiling water nuclear reactor in which the fuel assembly according to the present embodiment having the flow resistance member 15B is loaded in a core, in substantially the same manner as in embodiment 1, the flow of the gas-liquid two-phase flow occurring in this fuel assembly is divided into a gas-liquid two-phase flow flowing in each of the ferrules 9 present in an inner region where the resistance members 16 of the flow resistance member 15B are disposed and a gas-liquid two-phase flow flowing in each of the ferrules 9 present in an outer region surrounding the inner region. Since the pressure loss in the inner region of the flow resistance member 15B is increased as compared with that in the outer region of the flow resistance member 15B due to the effect of the resistance members 16, on the upper side of the flow resistance member 15B, the flow rate of the gas-liquid two-phase flow per unit area flowing through the outer region is increased. Due to this, cooling of each of the fuel rods 2 disposed in the outer region on the upper side of the flow resistance member 15B is promoted, and the critical power of these fuel rods 2 is increased, and thus, the thermal margin is increased.

The flow rate of the gas-liquid two-phase flow passing through each of the ferrules 9 in the inner region of the flow resistance member 15B is decreased, however, also in a region directly above the upper ends of the partial length fuel rods 2B, cooling of the fuel rods 2 is promoted in the same manner as in embodiment 1.

According to the present embodiment, each effect obtained in embodiment 1 can be obtained. Since the flow resistance member 15B has a support mechanism for supporting all the fuel rods 2, it is possible to substitute the fuel spacer 6.

[Embodiment 4]

A fuel assembly according to embodiment 3 which is other preferred embodiment of the present invention, applied to a boiling water nuclear reactor will be described in detail with reference to FIGS. 8 and 9.

Figure 8:
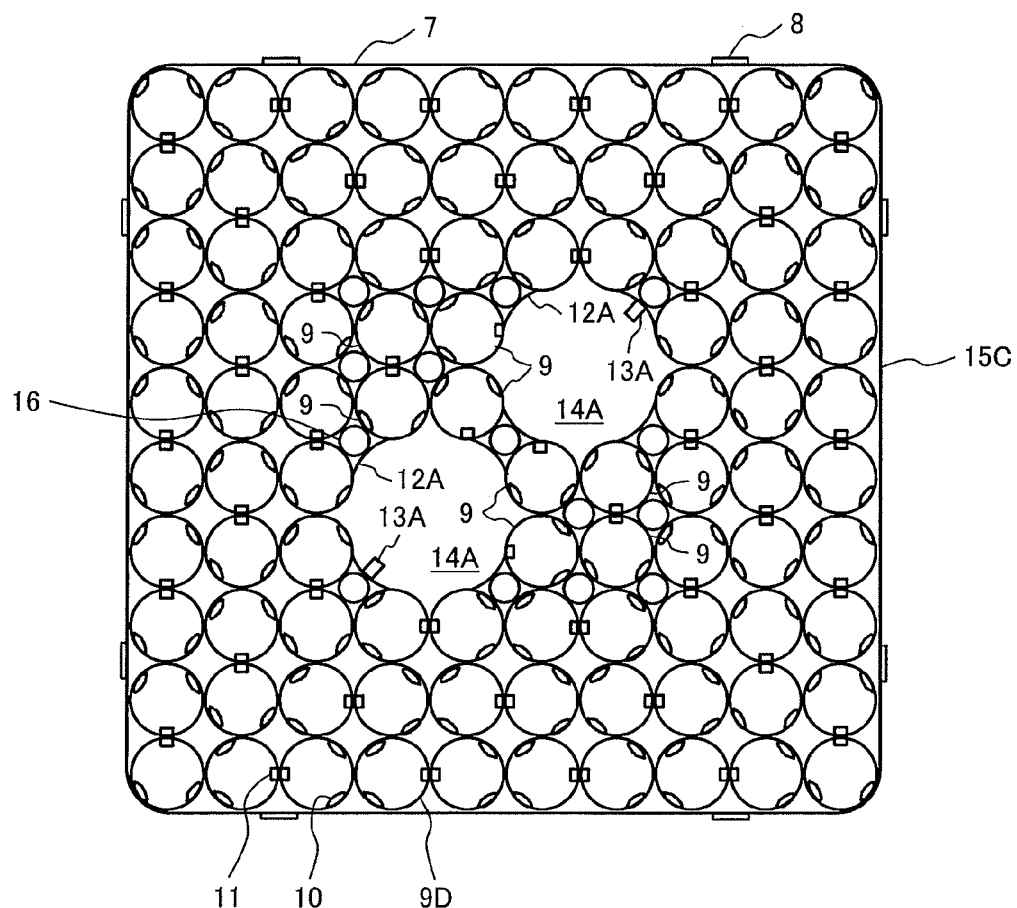
FIG. 8 is a top view showing a flow resistance member used in a fuel assembly according to embodiment 4 which is other preferred embodiment of the present invention.
Figure 9:
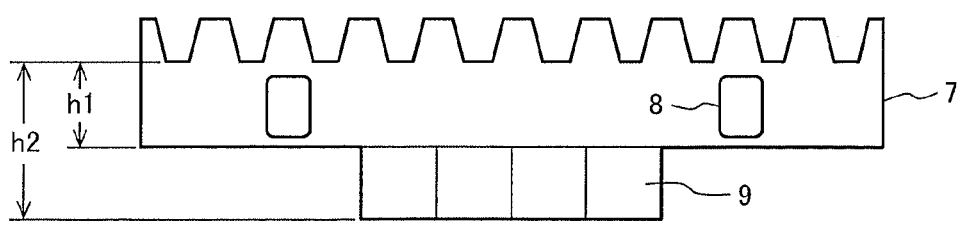
FIG. 9 is a side view showing the flow resistance member shown in FIG. 8.

A fuel assembly according to the present embodiment has a structure in which the flow resistance member 15B in the fuel assembly according to embodiment 3 is replaced with a flow resistance member 15C (see FIGS. 8 and 9). The other structures of the fuel assembly according to the present embodiment are similar to the fuel assembly according to embodiment 3.

The flow resistance member 15C has a structure in which a part of the plurality of ferrules 9 in the flow resistance member 15B used in the embodiment 3 are replaced with a plurality of ferrules 9D. The other structure of the flow resistance member 15C is the same as that of the flow resistance member 15B. The height (the length in the axial direction of the fuel assembly) h2 of the ferrule 9 used in the flow resistance member 15C is the same as that of the ferrule 9 used in the flow resistance member 15B. In the flow resistance member 15C, eight ferrules 9 are disposed in the inner region. That is, eight ferrules 9 are present on the inner side of the position where twelve resistance members 16 are disposed on the outermost side among the resistance members 16 disposed in the inner region. The ferrules 9D are disposed surrounding a region where the ferrules 9 are disposed. Due to this, the ferrules of three layers from the band 7 toward the inner side are ferrules 9D. The height (the length in the axial direction of the fuel assembly) h1 of the ferrule 9D is lower than the height h2 of the ferrule 9 (h1<h2). As a result, the height of the band 7 according to the present embodiment is lower than that of the band 7 according to embodiment 1.

In the present embodiment, in the same manner as embodiment 3, the resistance members 16 whose number and size are the same as in the case of the flow resistance member 15B are disposed in the inner region of the flow resistance member 15C, so that the projected area ratio C of the flow resistance member 15C is the same as that of the flow resistance member 15B, and is about 2.0. However, in the present embodiment, since the height h2 of the ferrule 9 disposed in the inner region of the flow resistance member 15C is higher than the height h1 of the ferrule 9D, the pressure loss of the ferrules 9 is larger than that of the ferrules 9D. Due to this, the pressure loss in the inner region of the flow resistance member 15C is larger than that in the outer region of the flow resistance member 15C by the action of the resistance members 16 and the ferrules 9. Moreover, a difference in pressure loss between in the inner region and in the outer region of the flow resistance member 15C is larger than that of the flow resistance member 15B.

One flow resistance member 15C is disposed in a channel box 7, and disposed at upper end portions of partial length fuel rods 2B in the axial direction of the fuel assembly in the same manner as the flow resistance member 15 used in embodiment 1. The flow resistance member 15C is supported by water rods 5 inserted into water rod disposition regions 14A in the same manner as the flow resistance member 15. Each of the fuel rods 2 is inserted into each of the ferrules 9 and the ferrules 9D of the flow resistance member 15C.

When operating a boiling water nuclear reactor in which the fuel assembly according to the present embodiment having the flow resistance member 15C is loaded in a core, in substantially the same manner as in embodiment 1, the flow of the gas-liquid two-phase flow occurring in this fuel assembly is divided into a gas-liquid two-phase flow flowing in each of the ferrules 9 present in an inner region where the resistance members 16 of the flow resistance member 15C are disposed and a gas-liquid two-phase flow flowing in each of the ferrules 9D present in an outer region surrounding the inner region. The flow rate of the gas-liquid two-phase flow per unit area flowing through the outer region of the flow resistance member 15C is increased as compared with the flow rate of the gas-liquid two-phase flow per unit area flowing through the outer region of the flow resistance member 15B. Due to this, cooling of each of the fuel rods 2 disposed in the outer region on the upper side of the flow resistance member 15C is promoted, and the critical power of these fuel rods 2 is increased, and thus, the thermal margin is increased.

The flow rate of the gas-liquid two-phase flow passing through each of the ferrules 9 in the inner region of the flow resistance member 15C is decreased, however, also in a region directly above the upper ends of the partial length fuel rods 2B, cooling of the fuel rods 2 is promoted in the same manner as in embodiment 1.

According to the present embodiment, the respective effects generated in embodiment 1 can be obtained. Since the height of the ferrule 9D disposed in the outer region is lower than that of the ferrule 9 according to embodiment 4, the pressure loss in the outer region can be decreased as compared with embodiment 3.

[Embodiment 5]

A fuel assembly according to embodiment 5 which is other preferred embodiment of the present invention, applied to a boiling water nuclear reactor will be described in detail with reference to FIG. 10.

Figure 10:
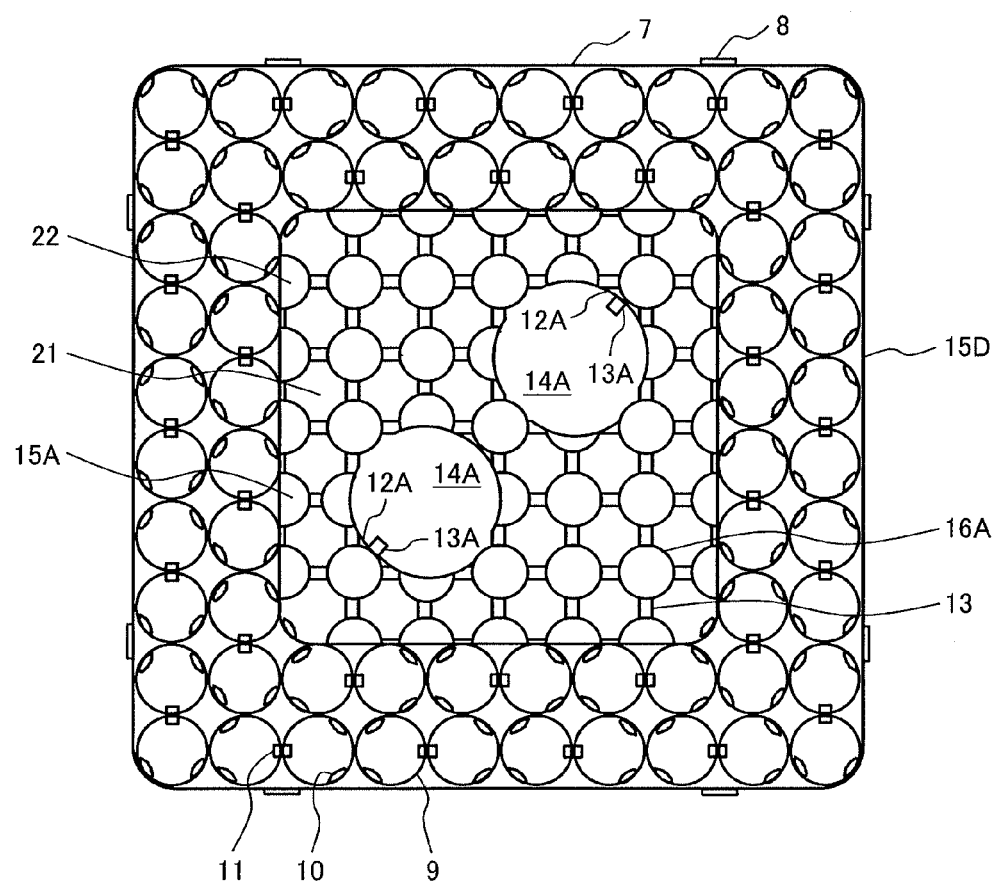
FIG. 10 is a top view showing a flow resistance member used in a fuel assembly according to embodiment 4 which is other preferred embodiment of the present invention.

A fuel assembly according to the present embodiment has a structure in which in the fuel assembly according to embodiment 3, the flow resistance member 15B is replaced with a flow resistance member 15D (see FIG. 10). The other structure of the fuel assembly according to the present embodiment is the same as that of the fuel assembly according to embodiment 3.

The flow resistance member 15D used in the present embodiment has a structure in which in the flow resistance member 15B used in embodiment 3, the constituent components (ferrules 9, resistance members 16, etc.) present in the inner region of the grid-shaped flow resistance member 15B are replaced with the flow resistance member 15A used in embodiment 2. The structure of the flow resistance member 15D excluding the flow resistance member 15A is the same as that of the fuel spacer 6. That is, in the flow resistance member 15D, ferrules 9 of two layers are disposed surrounding the flow resistance member 15A. Further, the flow resistance member 15A is present in the above-described inner region in the same manner as in embodiment 2. The projected area ratio C of the flow resistance member 15D is the same as that in the second embodiment and is 3.0.

One flow resistance member 15D is disposed in a channel box 7, and disposed at upper end portions of partial length fuel rods 2B in the axial direction of the fuel assembly in the same manner as the flow resistance member 15 used in embodiment 1. The flow resistance member 15D is supported by water rods 5 inserted into water rod disposition regions 14A in the same manner as the flow resistance member 15. Each of the fuel rods 2 is inserted into each of the ferrules 9 of the flow resistance member 15D and the fuel rod insertion holes 21 of the flow resistance member 15A.

When operating a boiling water nuclear reactor in which the fuel assembly according to the present embodiment having the flow resistance member 15D is loaded in a core, in substantially the same manner as in embodiment 1, the flow of the gas-liquid two-phase flow occurring in this fuel assembly is divided into a gas-liquid two-phase flow flowing in each of the fuel rod insertion holes 21 present in an inner region where the flow resistance member 15A is disposed and a gas-liquid two-phase flow flowing in each of the ferrules 9 present in an outer region surrounding the inner region. Since the pressure loss in the inner region of the flow resistance member 15D is increased as compared with that in the outer region of the flow resistance member 15D due to the effect of the flow resistance members 15A, on the upper side of the flow resistance member 15D, the flow rate of the gas-liquid two-phase flow per unit area flowing through the outer region is increased. Due to this, cooling of each of the fuel rods 2 disposed in the outer region on the upper side of the flow resistance member 15D is promoted, and the critical power of these fuel rods 2 is increased, and thus, the thermal margin is increased.

The flow rate of the gas-liquid two-phase flow passing through each of the fuel rod insertion holes 21 of the flow resistance member 15A disposed in the inner region of the flow resistance member 15D is decreased, however, also in a region directly above the upper ends of the partial length fuel rods 2B, cooling of the fuel rods 2 is promoted in the same manner as in embodiment 1.

According to the present embodiment, the respective effects generated in embodiment 1 can be obtained. In addition, according to the present embodiment, the following effects can be obtained. In order to increase the pressure loss, a grid-shaped configuration is effective, and on the contrary, a ferrule-type configuration is preferred in order to decrease the pressure loss. Therefore, in order to provide a difference in pressure loss between in the inner region and in the outer region in the cross section of the fuel assembly, by adopting the configuration of the flow resistance member 15D shown in FIG. 10, the thermal margin of the fuel rods 2 disposed in the outer region can be improved owing to a difference in flow resistance while substituting the fuel rod holding function of the fuel spacer.

REFERENCE SIGNS LIST

1: fuel assembly, 2, 2A: fuel rod, 2B: partial length fuel rod, 3: lower tie plate, 4: upper tie plate, 5: water rod, 6: fuel spacer, 7: channel box, 9, 9A, 9B, 9C, 9D: ferrule, 12, 12A: bridge member, 14, 14A: water rod disposition region, 15, 15A, 15B, 15C, 15D: flow resistance member, 16, 17: resistance member, 21: fuel rod insertion hole, 22: plate member.

What is claimed is:

1. A fuel assembly, comprising:

a plurality of fuel rods containing a fissile material;

a lower tie plate which supports each lower end portion of the fuel rods;

an upper tie plate which holds each upper end portion of the fuel rods;

a plurality of fuel spacers, each of which bundles the plurality of fuel rods;

a channel box attached to the upper tie plate, extending toward the lower tie plate, and surrounding the plurality of fuel rods bundled by the fuel spacers; and flow resistance members, which are disposed in an inner side of an outermost layer region of an array of the plurality of fuel rods in a cross section in a direction perpendicular to a center axis of the channel box, and through which coolant paths are formed, and which the fuel rods penetrate, wherein when the number of the fuel rods held by the flow resistance member is R, the number of all the fuel rods in the fuel assembly is A, and a projected area ratio C of projected area Sa of the flow resistance member from an upper tie plate side to projected area Sb of the fuel spacer which holds all the fuel rods in the fuel assembly from the upper tie plate side is defined by the following formula (1), the projected area ratio C is within a range of 1.5 to 5.2, $$C=(Sa/Sb)\times(A/R) \quad (1),$$

Sa is smaller than Sb, in one of the flow resistance members, ferrules are arranged in a square grid of six rows and six columns in a square-shaped band, and two water rod disposition regions, each of which occupies a region capable of disposing four ferrules, are formed in a central portion, adjacent ferrules are joined to each other by welding, and each of the ferrules disposed in an outermost layer is joined to the square-shaped band by welding, in each of the ferrules, only two protrusions are formed in a circumferential direction, and only a single spring member is provided across adjacent pairs of ferrules and attached thereto, a bridge member is provided only at every two adjacent ferrules facing a water rod disposition region and is attached to a side surface of each ferrule, and a spring member is attached to only one bridge member among the four bridge members facing each of the water rod disposition region.

2. The fuel assembly according to claim 1, wherein when a distance from a center of a given ferrule to the center of a ferrule which is immediately adjacent thereto and comes into contact with the given ferrule is taken as 1, the distance from the center of the given ferrule to the center of the ferrule which is immediately adjacent thereto and comes into contact with another ferrule in a direction orthogonal to a straight line connecting the center of the given ferrule to a center of the another ferrule is $\sqrt{2}$, and the given ferrule and the ferrule do not come into contact with each other, and a space is formed between the given ferrule and the ferrule, so that a space formed between the given ferrule and the ferrule formed between two ferrules immediately adjacent to each other in a diagonal direction of the flow resistance member, some of the resistance members are round plate-shaped members made of a zirconium alloy, and come into contact with each side surface of immediately adjacent four ferrules and are fixed by welding to the side surfaces of the immediately adjacent four ferrules, other resistance members are round plate-shaped members made of a zirconium alloy, and are disposed in each second space formed by the square-shaped band, and a diameter of the other resistance members is smaller than a diameter of the some of the resistance members.

* * * * *